United States Patent [19]

De Trano et al.

[11] Patent Number: 4,616,048

[45] Date of Patent: Oct. 7, 1986

[54] SOLUTION COMPOUNDING PROCESS FOR ACHIEVING UNIFORM, FINE PARTICLE SIZE DISPERSION OF CURING AGENTS

[75] Inventors: Mario N. De Trano, Massillon; William L. Hergenrother, Akron; Ralph A. Maglio, Wadsworth; David M. Roggeman, North Royalton, all of Ohio

[73] Assignee: The Firestone Tire & Rubber Company, Akron, Ohio

[21] Appl. No.: 728,020

[22] Filed: Apr. 29, 1985

[51] Int. Cl.[4] .................... C08L 23/22; B60C 21/08; C08K 5/08
[52] U.S. Cl. .................... 523/166; 152/347; 152/348; 524/110
[58] Field of Search ............... 523/166; 152/347, 348; 524/110

[56] References Cited

U.S. PATENT DOCUMENTS

| | | | |
|---|---|---|---|
| 2,765,018 | 10/1956 | Connell | 152/347 |
| 3,935,893 | 2/1976 | Stang | 152/347 |
| 4,064,922 | 12/1977 | Farber | 428/512 |
| 4,113,799 | 9/1978 | Van Ornum | 524/214 |
| 4,116,895 | 9/1978 | Kageyama | 152/347 |
| 4,256,158 | 3/1981 | Chautard | 152/330 F |
| 4,426,468 | 1/1984 | Van Ornum | 523/166 |
| 4,528,331 | 7/1985 | Bohm et al. | 523/166 |
| 4,539,344 | 9/1985 | Ornum et al. | 523/166 |

Primary Examiner—Herbert J. Lilling
Attorney, Agent, or Firm—Daniel N. Hall

[57] ABSTRACT

Rubber curing agents such as quinoids are solution compounded to achieve a uniform or homogeneous distribution thereof in a rubber composition. The curing agents are initially solubilized in an organic polar solvent and then mixed with the rubber masterbatch solution. The solvent is then removed. A uniform fine distribution of the curing agent results in improved physical properties. The present invention is particularly suitable as a sealant composition for tires.

20 Claims, No Drawings

SOLUTION COMPOUNDING PROCESS FOR ACHIEVING UNIFORM, FINE PARTICLE SIZE DISPERSION OF CURING AGENTS

TECHNICAL FIELD

The present invention relates to solution compounding of quinoid curing agents. More specifically, the present invention relates to predissolving the curing agent in an organic polar solvent with subsequent mixing and precipitation of the curing agent within a rubber cement composition.

BACKGROUND

Heretofore, various curing agents were directly added to a rubber composition and mixed therewith. Problems were encountered with various specific types of curing agents with regard to dispersion, aggregates, and thus affected with physical properties thereof.

U.S. Pat. No. 4,113,799 to VanOrnum relates to an elastomer sealant composition having a high average molecular weight butyl rubber and a low average molecular weight butyl rubber in a ratio of between about 35/65 and 45/55 in admixture with a tackifier present in an amount of between about 55 and 70 weight percent of the composition.

U.S. Pat. No. 3,935,893 to Stang relates to a self-sealing vehicle tire and sealant composition having high molecular weight butyl rubber, a low molecular weight butyl rubber, a liquid polybutylene tackifier, a partially hydrogenated block copolymer of styrene and a conjugated diene, carbon black, and suitable curing agents for the butyl rubber.

U.S. Pat. No. 4,064,922 to Farber relates to a puncture sealant composition in tire having a major portion of a low molecular weight elastomer, a minor portion of high molecular weight elastomer and containing crosslinking agents in an amounts sufficient to give a partial cure.

U.S. Pat. No. 4,426,468 to VanOrnum et al relates to a sealant composition containing a cured butyl rubber present in the form of a copolymer having a molecular weight in excess of 100,000 and one or more tackifiers, wherein the tensile strength, elongation and crosslink density of the composition are adjusted to produce the necessary properties for tire sealants. Although paraquinone dioxime is blended in cyclohexanone to a dilution of about 40% solids by weight and added to a butyl rubber mixture and dispersed therein, the amount of solids is so great that a slurry exists. Many insoluble crystal sites exist for crystal growth and actually result in larger crystals upon mixing with the rubber cement.

U.S. Pat. No. 4,116,895 to Kageyama relates to a puncture sealant composition containing a crosslinking agent for rubber and a crosslinking activator. Various quinoids can be utilized as a crosslinking agent and are added directly to the rubber composition.

U.S. Pat. No. 2,765,018 to Connell and U.S. Pat. No. 4,256,158 to Chautard et al both relate to utilization of a quinoid curing agent which is directly added to a rubber composition.

SUMMARY OF INVENTION

Accordingly, it is an aspect of the present invention to provide a method of dispersing quinoid curing agents in a rubber composition.

It is yet another aspect of the present invention to disperse quinoid curing agents in a rubber composition, as above, whereby a uniform fine distribution is obtained.

It is a still further aspect of the present invention to disperse quinoid curing agents in a rubber composition, as above, so that a balanced combination of properties including tackiness, resiliency, compliance and cohesive strength essential for maximum sealing effectiveness is achieved.

These and other aspects of the present invention will become apparent from the following specification which describes in detail the invention.

In general, the process for solution compounding a quinoid curing agent for a sealant composition, comprises the steps of:

(A) adding at least one quinoid curing agent to a solubilizing organic polar solvent and forming a solution, (B) adding said quinoid curing agent solution to a rubber cement, and mixing and precipitating said curing agent in said cement so that a uniform fine dispersion of said curing agent is formed, and (C) removing the volatile portion of said mixture to form a dry sealant component.

DISCLOSURE OF INVENTION

According to the present invention, quinoid curing agents are readily and uniformly dispersed in rubber compositions, especially rubber sealant compositions. Moreover, the present invention also relates to the use of peroxide cocuratives.

The rubber or the sealant rubber compounds of the present invention generally contain at least one high molecular weight elastomers as well as at least one liquid elastomeric type tackifiers. Typically, elastomers which can be utilized in the present invention are generally high molecular weight rubbers which include ethylene-propylene-diene terpolymers (EPDM), polybutadiene, hydrogenated polybutadiene, butyl rubber, halo butyl rubber for example chloro- or bromo-, acrylonitrile-butadiene copolymer, styrene butadiene copolymer, natural rubber, cispolyisoprene and the like. As noted, mixtures of two or more of the above polymers can also be used as can various other conventional high molecular weight rubbers. The number average molecular weight of said high molecular weight rubbers is at least about 50,000 and desirably at least about 100,000.

The tackifiers utilized in the present invention are polymers of relatively low molecular weight, for example, those having a number average molecular weight of about 500 to about 5,000 and often are liquids at room temperature (that is about 20° C. to about 25° C.).

Many structural types of low molecular polymers in liquid form are useful including ethylene-propylene copolymer (EPC), ethylene-propylene-diene terpolymer, polybutadiene (PBD), hydrogenated PBD, butyl rubber (BR), polypropylene, acrylonitrile-butadiene rubber (ANB), styrene-butadiene copolymer (SBR), synthetic polyterpenes, thermoplastic olefins, pentaerythritol esters of hydrogenated rosins, triethylene glycol esters of hydrogenated rosins, vinyl toluene copolymers, alkyl aromatics, coumarone-indenes, depolymerized natural rubber (DPR) and polybutenes. Because of their cost, availability and properties the polybutenes are particularly useful.

Such polybutenes preferably have a number average molecular weight exceeding about 1000 as this has an effect on minimizing the possibility of migration into adjacent tire components. While the tacifier can be utilized in an amount of at least 300 phr, typically it is utilized in an amount ranging from about 300 to about 900 phr. It is preferably prepared by polymerizing an isobutylene rich stream with a metal halide catalyst and preferably has a polymer backbone structure resembling polyisobutylene. Very suitable polybutenes are available under the trademark Indopol, e.g. Indopol H-300 and Indopol H-1900, from Amoco. The manufacturer indicates that these Indopols have a polymer backbone structure resembling isobutylene and that the Indopol H-300 and Indopol H-1900 have viscosities ranging from about 627–675, to about 4069–4382 centistokes, respectively at 210° F., (STM D-445). The number average molecular weights (Mn) of the same materials is respectively from about 1290 to about 2300, as determined by vapor pressure osmometry. In addition to the above commercially available tackifiers, an aliphatic type tackifier can be utilized such as Piccotac B-BHT which is manufactured by Hercules.

Generally, from about 55 to about 90 percent by weight of the sealant rubber compound of the present invention are the tackifiers with from about 65 percent to about 90 percent being preferred. The amount of the high molecular weight rubber compounds accordingly is from about 10 percent to about 45 percent by weight with from about 10 percent to about 35 percent being preferred.

The quinoid curing agents generally include any suitable quinone-dioxime compound. The amount of the quinoid agent is generally utilized in an amount of from 0.1 to about 5.0 parts by weight per 100 parts by weight of the total dry component as discussed hereinbelow. A desirable amount is from 0.2 to about 2.0 with a preferred amount being from 0.3 to about 1.0 parts by weight per 100 parts of said dry sealant component. Suitable quinoid compounds include p-quinonedioxime, p-quinone dioxime diacetate, p-quinone dioxime dicaproate, p-quinone dioxime di-laurate, p-quinone dioxime distearate, p-quinone dioxime dicrotonate, p-quinone dioxime dinaphthenate, p-quinone dioxime succinate, p-quinone dioxime adipate, p-quinone dioxime difuroate, p-quinone dioxime dibenzoate, p-quinone dioxime di(o-chlorobenzoate), p-quinone dioxime di-(p-chloro benzoate), p-quinone dioxime di-(p-nitro benzoate), p-quinone dioxime di-(m-nitro benzoate), p-quinone dioxime di-(3,5 dinitro benzoate), p-quinone dioxime di-(p-methoxy benzoate), p-quinone dioxime di(n-amyl oxy benzoate), p-quinone dioxime di-(m-bromo benzoate), p-quinone dioxime di-(phenyl acetate), p-quinone dioxime di-cinnamate, p-quinone dioxime di-(N-phenyl carbamate), bis ethoxy methyl ether of quinone dioxime, mono-zinc salt of quinone dioxime, di-zinc salt of quinone dioxime, zinc chloride double salt of quinone dioxime, mono mercury salt of quinone dioxime, di-mercuric salt of quinone dioxime, mercuric chloride double salt of quinone dioxime, mono-barium chloride double salt of quinone dioxime, mono-cupric salt of quinone dioxime, mono-lead salt of quinone dioxime, mono-barium salt of quinone dioxime, mono-magnesium salt of quinone dioxime, mono-calcium salt of quinone dioxime, silver salt of p-quinone dioxime, 1,4-naphthoquinone dioxime, chloro methyl quinone dioxime, 2,6-dimethyl 1,4-quinone dioxime, 2-phenyl-1,4-quinone dioxime, 2-benzyl-1,4-quinone dioxime, 2-ethyl-1,4-quinone dioxime, thymo quinone dioxime, 2-chlor-p-quinone dioxime, thymo quinone dioxime dibenzoate, thymo quinone dioxime diacetate, p-quinone dioxime phosphochloride, and the like, and mixtures thereof. A perferred quinoid compound is p-benzoquinone dioxime.

Preparation of a sealant composition of the present invention is generally as follows: Initially, a mixed masterbatch is prepared. The masterbatch generally contains the high molecular weight elastomers such as EPDM and a portion of the various low molecular weight tackifiers. The masterbatch also usually contains a reinforcing agent such as carbon black or other suitable agents as set forth hereinbelow. The masterbatch is then added to a vessel or container having a solvent therein such as hexane. The vessel is heated to dissolve the masterbatch. The mixture is then cooled and most of the remaining tackifiers are added to the vessel and blended therein. Quinoid curing agents which are dissolved in an organic polar solvent as described more fully hereinbelow are added to the vessel usually with slight heat and under agitation so as to disperse and precipitate them as very fine particles. The above mixture of materials generally are referred to as a rubber cement. The cement solution will generally contain about 50 percent by weight of solids therein although, of course, the amount of solids can widely vary. The rubber cement solution is then desolventized as set forth more fully hereinbelow as by heating and applying a vacuum thereto to remove the volatile solvents or the volatile component of the solvents. The desolventized solution is generally referred to as the dry sealant component or component "A". The dry sealant component can be stored in any suitable manner until required.

According to the present invention, the quinoid compound is initially or pre-dissolved in a suitable organic polar solvent. The amount of solubilizing solvent is such that the quinoid compound is soluble therein. Generally, the amount of quinoid is up to but less than a saturated solution, and usually up to 10 percent by weight of the organic polar solvent (that is, based upon 100 parts by weight of said solvent) and generally 1 percent or more. Not only must the solvent readily dissolve the quinoid curing agent to a resonable concentration but it must also be compatible with the masterbatch solvents in the rubber cement. Examples of suitable quinoid solubilizing solvents include cyclohexanone, furan, dioxane, dioxolane, N-methyl pyrrolidone, dimethylsulfoxide (DMSO); chloroform (CHCl$_3$), methylene chloride (CH$_2$Cl$_2$) and tetrahydrofuran, and the like. Especially suitable solvents are tetrahydrofuran, and DMSO, and N-methyl pyrrolidone. Most of these solvents are volatile so that they can be stripped off as by heat and/or vacuum although DMSO and N-methyl pyrrolidone have low volatility and usually are not evaported.

The quinoid curing agent solubilized in the organic polar solvent is then charged or added to the above noted masterbatch solution to form the rubber cement solution, preferably under mixing or agitation. The addition of the quinoid solution is carried out in a manner such that a very fine dispersion of the quinoid is precipitated during mixing. The size of the precipitated quinoid curing agents should have an average particle size of less than 15 microns, desirably less than 10 microns and preferably less than 5 microns. It is important that the solubilized quinoid be thoroughly mixed with the rubber cement so that a uniform or homogeneous distribution thereof is obtained. Although any number of techniques can be utilized to charge the solubilized quinoid curing agent to the rubber cement, care should be taken with regard to the rate of addition of the quinoid solution in accordance with the mixing equipment being used so as to avoid premature precipitation of the quinoid compound. Generally, mixing occurs at a temperature of from about 20° C. to about 65° C. and preferably at a temperature of from about 25° C. to about 40° C.

Additionally, other ingredients which can be utilized to prepare the rubber cement include various reinforcing agents. A suitable agent includes finely divided carbon such as carbon black. Other suitable reinforcing agents include zinc oxide, aluminum hydrate, lithopone, whiting, clays, hydrated silicas, calcium silicates, silicoaluminates, magnesium oxide, and magnesium carbonate. The amount of such reinforcing agents is from about 0.1 to about 50 parts, and desirably from abut 1 to about 20 parts by weight per 100 parts by weight of said dry solvent.

Another desirable ingredient is a surfactant. It is thought that the surfactant stabilizes the growth of small quinoid particles. Generally, any suitable surfactant can be utilized such as lecithin. The amount of the surfactant is from 0.001 to about 2 percent by weight based upon the total weight of said dry sealant component. Other surfactants include conventional anionic as well as nonionic surfactants such as various carboxylic acid salts, such as common soap; naphthenates; various sulfuric esters such as alkyl sulfates; sulfated oils; various ether sulfates, such as sodium poly(ethylene-oxide)-sulfate; various sulfonates such as alkyl and alkyl-aryl sulfonates; various phosphates and phosphonates such as alkyl phosphates and alkyl phosphonates; various ethers; various esters and various amides.

A "B" cocuring agent component or peroxide component is generally prepared as follows: The desired peroxides as set forth hereinbelow usually have an average particle size of less than 15 microns, desirably less than 10 microns and preferably less than 5 microns. Such fine particle peroxides are added to a vessel. A low molecular weight tackifier, as set forth above, is also added and generally serves as a carrier for the various ingredients. The amount of tackifier generally ranges from about 20 parts to about 50 parts by weight based upon the total amount of weight of said "B" component. Another optional component which can be added are polar solvent accelerators which are utilized in the amount of from about 0.0 or 0.1 to about 20 and desirably about 0.5 to about 15 parts by weight per 100 parts by weight of the "B" component. In the present invention, it is preferred that the peroxide curing compounds be either predispersed in the polar solvent accelerator prior to incorporation into the "B" component or sequentially or cojointly added thereto. Suitable polar solvent accelerators include water, primary, secondary and tertiary alcohols and polyols such as aliphatic, cycloaliphatic and aromatic alcohols containing from 1 to 12 carbon atoms as for example methanol, ethanol, propanol, butanol, n-octanol, n-heptanol, n-hexanol, isooctanol, 2,2-dimethyl-hexane-6-ol, t-amyl alcohol, 4-methyl cyclohexanol, benzyl alcohol, butanediol, propylene glycol and ethylene glycol; ketones, such as ethyl methyl ketone and cyclohexanone; aldehydes such as benzaldehyde, acetaldehyde and propylaldehyde; ethers such as tetrahydrofuran, dioxane, dioxalane and diethyl ether; alkyl and aromatic nitriles such as propylnitrile and benzonitrile; acids such as phosphoric acid, acetic acid and proprionic acid; and aqueous bases such as NaOH; esters such as dimethy succinate and diethyl succinate. Dipolar, aprotic compounds such as dialkyl formamides, dialkyl acetamides and dialkylsulfoxides such as dimethylsufoxide are also useful. Mixtures of these accelerators can be utilized. The above polar accelerators can also serve to modify viscosity. Various compounds are mixed together with a sufficient amount of tackifier therein so that component "B" has a viscosity such that it is readily mixed with the "A" component.

Mixture of the "A" component and the "B" component is accomplished in any suitable mixing device with the requirement that once these compounds are mixed together, they must be immediately applied to the end product. Generally, an extruder is utilized such that the sealant composition is mixed and then is directly applied to a tire in a very short period of time.

Referring now to the "B" component, it contains an organic peroxide cocurative. A nonexclusive list of organic peroxides include benzoyl peroxide; t-butyl peroxypivalate; 2,4-dichloro-benzoyl peroxide; decanoylperoxide; propionyl peroxide; hydroxyheptyl peroxide; cyclohexanone peroxide; 2,5-dimethylhexyl-2,5-di(peroxy-benzoate); t-butyl perbenzoate; dicumyl peroxide; 2,5-dimethyl-2,5-di(t-butylperoxy)hexyne-3; 2,5-di-methyl 2,5-di(t-butylperoxy)hexane; 3,5-dimethyl-2,5-di(benzoyl-peroxy)hexane; di-t-butyl peroxide; p-menthane hydro-peroxide; cumene hydroperoxide; 2,5-dimethyl-2,5-di(hydroperoxy)hexane; t-butyl hydroperoxide; lauroyl peroxide; t-amyl perbenzoate; or mixtures thereof. Preferred organic peroxides are benzoyl peroxide and t-butyl perbenzoate. Mixtures of two or more of the above peroxides can also be used. Other useful peroxide curing agents are known to those skilled in the art.

It is usually desirable to support the peroxide cocuring agent on an inert filler carrier for reasons of safety and convenience in handling.

Typical materials which can be utilized as solid supports for the above-identified peroxide curing agents include corn starch, wheat starch bases, clay, and inorganic phosphate bases such as calcium phosphate, such materials should be of a very fine particle size.

Typical commercially available supported peroxides which may be utilized in the instant invention include: LUPERCO AA from Pennwalt Chemicals which contains approximately 33 percent benzoyl peroxide supported on a wheat starch base; and LUPERCO ACP from Pennwalt Chemicals which is approximately 35 percent benzoyl peroxide supported on an inorganic phosphate base. As is well known to those of skill in the art, peroxides such as those described above, should be handled with the utmost care whether they be pure, supported on inert filler or combined with polymer. The tendency of peroxides to decompose or react violently requires the exercise of care and skill in their use and the skilled artisan will thoroughly familiarize himself with their properties before employing time.

The amount of peroxide utilized on a molar basis is generally in excess of the quinoid curing agent. Thus, from 0.5 to about 10.0 moles and preferrably from about 1.0 to about 5.0 moles of a peroxide compound is utilized per mole of quinoid curing agent. Thus, from about 0.5 to about 10 parts, desirably from 0.1 to about 8 parts and preferrably from about 0.3 to about 5 parts by weight of the peroxide is utilized per 100 parts by weight of the total sealant composition.

A sealant when made according to the solution-compounding process of the present invention has the advantage of generally achieving a required balance of physical and rheological properties, essential for effective sealing performance. Moreover, since the curative as well as the cocuratives are uniformly and efficiently dispersed, the overall amount thereof utilized can be reduced resulting in lower sealant costs and excellent aging stability. Another advantage is that uniform consistency in reproducibility of the product results in greater process control during application of the sealant to the tire. In addition to tires, the sealant material can be utilized for caulking compounds, roofing adhesive and contact adhesive.

The application of the sealant material to the tire can occur in any conventional manner as by brushing, extrusion coating, and the like. Desirably, cement spraying is not utilized due to the problems and hazards created by the solvent vapors. Once applied to the tire or other article, the sealant can be cured. Curing can take place from ambient temperature, that is from about 15° C., up to about 125° C. with from about 60° C. to about 100° C. being preferred.

The invention will be better understood by reference to the following examples.

EXAMPLES 1-6

Formulations were prepared containing the ingredients set forth in Table I.

TABLE I

| SEALANT COMPOSITIONS[1] | | | | | | |
|---|---|---|---|---|---|---|
| | A[2] | B[2] | C[2] | D[2] | E[3] | F[3] |
| EPDM[4] | 15 | 15 | 15 | 15 | 15 | 15 |
| N326 Carbon Black | 5 | 5 | 5 | 5 | 5 | 5 |
| Indopol H-1900[5] | 50.5 | 50.5 | 50.5 | 50.5 | 50.5 | 50.5 |
| Indopol H-300[5] | 29.0 | 26.4 | 29.0 | 26.4 | 29.0 | 26.4 |
| Piccotac B-BHT[6] | 5.5 | 5.5 | 5.5 | 5.5 | 5.5 | 5.5 |
| 1-Octanol[7] | 1.3 | 1.3 | 1.3 | 1.3 | 1.3 | 1.3 |
| p-Benzoquinone-dioxime (BQD)[8] | 1.0 | 1.0 | 0.5 | 0.5 | 1.0 | 1.0 |
| Benzoyl Peroxide, 33%[9] | 11.0 | 6.5 | 11.0 | 6.5 | 11.0 | 6.5 |
| t-Butyl Perbenzoate[10] | — | 1.4 | — | 1.4 | — | 1.4 |

[1]Ingredients listed on dry weight basis.
[2]Prepared by solution-compounding process.
[3]Prepared by conventional mixing technique.
[4]Epsyn 55, Copolymer Corp.
[5]Liquid polybutene, Amoco Chemicals.
[6]Tackifier resin, Hercules, Inc.
[7]Alfol 8, Conoco Chemicals.
[8]Vulcanizing agent, Lord Chemical Products.
[9]Luperco AA, 33% BPO blend with wheat starch, Pennwalt Chemicals.
[10]Esperox 10, Witco Chemical.

Formulations A through D were prepared in a manner according to the present invention. Formulations E and F were prepared by conventional mixing techniques, that is where the p-benzoquinone-dioxime was directly added to the masterbatch. Formulations A through D were prepared by initially adding the high molecular EPDM polymer and compounding it with carbon black and a small amount of the tackifying ingredients in a Banbury at up to approximately 150° C. to form a masterbatch. The masterbatch was dissolved at about 90° C. to about 100° C. in hexane. The cement was mixed in an anchor turbine stainless steel mixing vessel between 80 to 150 rpm to form a homogeneous mixture. The mixture was cooled, and most of the remaining tackifier added and dissolved at room temperature. Separately from the cement, a 5 percent solution of BQD with the surfactant in tetrahydrofuran at a temperature of approximately 25° C. was prepared. The solubilized BQD was then charged to the cement under agitation and mixed for approximately 4-6 hours. After the BQD was uniformly mixed throughout the cement, the various solvents were removed by heating approximately 70° to 100° C. and pulling a vacuum until most of the hexane and volatile solvents were removed.

The "B" component was prepared by mixing the amount of various peroxides set forth in Table I with the n-octanol and a small portion of the low molecular weight tackifier and thoroughly mixed at about 25° C.

The various sealant formulations were then tested with regard to torque response. That is, the previously compounded dry sealant portion of the compositions listed in Table I was admixed with the catalyst portion (Peroxides) in the Brabender Plasticorder operating at 60 rpm and 70° C. to effect vulcanization. As the material in the Plasticorder vulcanizes, the torque builds in response, reaching a maximum value. A higher value of torque increase from the initial value and the rate at which the maximum value is attained (cure rate) are measures of the effectiveness and efficiency of the vulcanizing system. The results are set forth in Table II.

TABLE II

| PLASTICORDER TORQUE RESPONSE DURING SEALANT VULCANIZATION[1] | | | | |
|---|---|---|---|---|
| Composition | Minimum | Maximum | Rise[2] | Cure Rate[3] Mins |
| Solution-Compounded | | | | |
| A | 120 | 390 | 270 | 1.0 |
| B | 120 | 280 | 160 | 0.75 |
| C | 95 | 255 | 160 | 1.25 |
| D | 90 | 220 | 130 | 1.25 |
| Conventional Mixing | | | | |
| E | 100 | 180 | 80 | 2.0 |
| F | 100 | 160 | 60 | 1.5 |

[1]Torque in meter-grams.
[2]Difference between maximum and minimum torque values.
[3]Time to reach maximum torque in minutes.

The much higher maximum torque values and significantly faster cure rates found for the solution-compounded compositions reported in Table II, that is compositions A through D, show the remarkably greater effectiveness and efficiency of the vulcanizing system obtained according to the present invention in comparison with conventionally mixed compositions, that is compositions E and F. Moreover, compositions C and D which contain only one-half of the level of BQD in comparison to the other compositions further illustrate the effectiveness and efficiency of the solution-compounded compositions of the present invention.

The compositions were then tested with regard to solvent swelling behavior. That is, the Plasticorder mixed compositions were allowed to cool to room temperature, after which a 1 g sample was placed in 400 cc of cyclohexane and allowed to swell for 72 hours at room temperature. The sample was subsequently dried down in a vacuum oven at 100° C. to constant weight. The ratio of the weight of the swollen sample to that of the dried sample is recorded as the weight swell ratio, S.R., in Table IIIA. The S.R. is a measure of the degree of crosslinking (cure) which the composition experienced during Plasticorder mixing. A lower SR corresponds to a higher degree of cure. The S.R. results in Table III show the remarkably higher degree of cure attained with the solution-compounded compositions A, B, C and D compared with the control composition E and F which failed to show a swell ratio, dissolving instead in the solvent. These data show that compositions E and F failed to achieve a sufficient degree of cure during Plasticorder mixing.

TABLE IIIA

| | SOLVENT SWELLING BEHAVIOR | | |
|---|---|---|---|
| Composition | Swell Ratio | Solvent Clarity | Microgel |
| Solution-Compounded | | | |
| A | 16.2 | Clear | Negligible |
| B | 19.9 | " | " |
| C | 28.7 | " | " |
| D | 26.7 | " | " |
| Conventional Mixing | | | |
| E | Dissolved[1] | Cloudy (Not fully cured) | N/A[2] |
| F | " | Cloudy (Not fully cured) | " |

[1]Swell ratio impossible to measure as sample dissolved.
[2]Could not determine microgel as sample dissolved.

TABLE IIIB

| | SOLVENT SWELLING BEHAVIOR | | |
|---|---|---|---|
| Sealant-Tire Samples | Swell Ratio | Solvent Clarity | Microgel |
| Solution-Compounded[1] | | | |
| 1 | 37.8 | Clear | Negligible |
| 2 | 30.9 | " | " |
| 3 | 35.2 | " | " |
| 4 | 33.0 | " | " |
| 5 | 41.4 | " | " |
| Conventional Mixing[2] | | | |
| 6 | 33.4 | Cloudy | Significant Amt. |
| 7 | 31.8 | " | Significant Amt. |

[1]Samples from five sealant coated tires.
[2]Samples from two sealant coated tires.

A qualitative but very important indication of the homgeneity of cure is provided by the degree of clarity of the solvent and the presence of microgel during the swelling test. The fact that compositions A,B,C, and D show a clear solvent and no micogel indicates the uniform crosslink density distribution achieved in these compositions. By contrast, the cloudy solvent of compositions E and F indicates again the results of insufficient cure.

Additional swelling test data are reported in Table IIIB for sealant compositions which were used to prepare sealant-coated tires. The compositions are essentially those of compositions D and F in Table I except that the total level of peroxide was 3 parts by weight of the complete composition. In this case the sealants received a post heated treatment of 30 minutes at 80° C. Small samples of sealant taken from the sealant coated tires were used for the swelling tests. It can be seen in Table IIIB that the control compositions (conventional mixing), although achieving a swell ratio in the range of the test compositions, show a cloudy solvent along with a significant amount of microgel relfecting an inhomogeneous crosslink density. On the other hand, the test compositions (solution-compounded) show a clear solvent and no microgel which attests to the uniform crosslink density achieved by the solution-compounding process.

The compositions were then tested with regard to aging stability. That is, samples of compositions C,D and control composition E were oven aged at 100° C. for 4 weeks. Swell ratios were determined on the unaged samples and on aged samples at intervals of 3 days, 1, 2 and 4 weeks during the aging period. The compositions were evaluated using linear regression analysis of the data; that is, the slope of the line calculated by the least squares method was used as a measure of aging stability. The slopes of the lines found are reported in Table IV.

TABLE IV

| AGING STABILITY, 100° C. | |
|---|---|
| Composition | Least Squares Slope |
| Solution-Compounded | |
| C | +.085 |
| D | +.162 |
| Conventional Mixing | |
| E | −.337 |

The extremely low slope value for compositions C and D show their excellent aging stability. In contrast, the strongly negative slope value for the control composition E indicates that this composition continued to crosslink (increase in cure) during aging showing less than satisfactory aging resistance.

The compositions were further tested with regard to Indoor tire tests. That is indoor nail in/out tests designed to evaluate puncture sealing performance were conducted using sealant coated tires containing sealant prepared by the solution-compounding process of the instant invention. Results were compared with those obtained for the control composition prepared by the conventional mixing technique.

The compositions used were essentially those of compositions D and F in Table I except that the total level of peroxide was 3 parts by weight of the complete compositions.

Steel radial 721 tires (P225/75R15) used for these tests were coated with sealant. The sealant coated tires were then post heated for 30 minutes at 80° C.

The nail test procedure consists of puncturing the tire with six, size #8, nails prior to running the tire on a dynomometer test fixture at a rotation speed corresponding to 50 m.p.h. and a length of time corresponding to 11,000 miles. Two nails each are removed from the tire at intervals of 100, 5,000 and 10,000 miles. Upon completion of the test the sealant tires were evaluated for form stability, blow through cratering and sealing efficiency.

Form stability relates to the amount of flow the sealant may have experienced during the test. Excessive flow could potentially lead to tire imbalance in severe cases, in addition to leaving the shoulder areas of the tire less protected by sealant. Form stability is assessed both visually and by taking a thickness profile of the sealant in the tire before and after the Indoor nail test.

Blow through cratering is manifested as a depletion of sealant around a puncture site resulting from too much sealant being forced through the opening left by the puncturing object. This condition reflects insufficient cohesive strength of the sealant.

Sealing efficiency is determined as the percent of nail puncture sites which successfully resist air leakage during the test.

TABLE V

| INDOOR NAIL IN/OUT TIRE TEST | | | |
|---|---|---|---|
| Sealant Tire Designation | Form Stability | Blow Through Craters | Sealing Efficiency, % |
| Solution-Compounded "D" Formulations | | | |
| D-1 | Good | None | 83 |
| D-2 | " | " | 100 |
| D-3 | " | " | 83 |
| D-4 | " | " | 67 |
| Conventional Mixing "F" Formulations | | | |
| F-1 | Poor | Large | 67 |

TABLE V-continued

| Sealant Tire Designation | INDOOR NAIL IN/OUT TIRE TEST | | |
|---|---|---|---|
| | Form Stability | Blow Through Craters | Sealing Efficiency, % |
| F-2 | " | " | 33 |

As the results in Table V illustrate, the sealant prepared by the solution-compounding process showed good form stability, no evidence of blow through cratering and a very respectable 80% sealing efficiency averaged over 5 tires. Contrast these results with the control sealant (conventional mixing) which showed poor form stability, large blow through crater formation and only a 50% sealing efficiency (average of 2 tires).

Clearly, the product prepared by the solution-compounding process of the instant invention results in significantly improved overall sealing performance.

While in accordance with the patent statutes the best mode of preferred embodiment has been described in detail, other embodiments can be utilized. Accordingly, the scope of the present invention is set forth in the attached claims.

What is claimed is:

1. A solution compounding process for forming a dry sealant composition, comprising the steps of:
    (A) adding at least one quinoid curing agent to a solubilizing organic polar solvent and forming a dissolved quinoid solution,
    (B) adding said dissolved quinoid curing agent solution to a rubber cement, and mixing and precipitating during mixing said curing agent in said cement so that a uniform fine dispersion of said curing agent is formed, and
    (C) removing the volatile solvent of said mixture to form the dry sealant component wherein the average particle size of said dispersed quinoid curing agent is less than 10 microns.

2. A process according to claim 1, wherein said rubber cement contains at least one high molecular weight polymer and at least one low molecular weight liquid tackifier, and wherein the amount of said quinoid curing agent is up to a saturated amount of said organic polar solvent.

3. A process according to claim 2, wherein the amount of said quinoid is up to about 10 percent by weight based upon 100 parts by weight of said organic polar solvent.

4. A process according to claim 2, wherein the amount of said quinoid is from about 0.2 to about 2.0 parts by weight per 100 parts by weight of said dry sealant component, and wherein the average particle size of said dispersed quinoid curing agent is less than 5 microns.

5. A process according to claim 4, wherein the amount of said high molecular weight rubber polymer is from about 10 percent to about 45 percent by weight and wherein the amount of said low molecular weight liquid tackifier is from about 55 percent to about 90 percent by weight.

6. A process according to claim 5, wherein said high molecular weight polymer is selected from the group consisting of EPDM, polybutadiene, butyl rubber, halo butyl rubber, acrylonitrile-butadiene copolymer, styrene-butadiene copolymer, natural rubber, cispolyisoprene, and combinations thereof, wherein said liquid tackifier has a number average molecular weight of from about 500 to about 5,000, and wherein said quinoid curative has an average particle size of less than 5 microns.

7. A process according to claim 6, wherein the amount of said quinoid curing agent is from about 0.3 to about 1.0 part by weight, including adding a nonionic or an anionic surfactant to said solubilized quinoid curing agent, the amount of said surfactant agent being from about 0.001 to about 2.0 percent by weight based upon said dry sealant component.

8. A process according to claim 7, wherein said organic polar solvent is selected from the class consisting of tetrahydrofuran, cyclohexanone, furan, dioxane, dioxolane, dimethylsulfoxide, chloroform and methylene chloride.

9. A process according to claim 4, wherein said B, mixing step is carried out at a temperature of from about 25° C. to about 65° C.

10. A process according to claim 1, including adding a cocurative peroxide component to said dry sealant component to form the sealant composition, said peroxide component containing an organic peroxide in an amount from about 0.5 to about 10.0 mole per mole of said quinoid curing agent, said peroxide component optionally containing from about 0.1 to about 20 parts by weight of a polar solvent accelerator based upon 100 parts by weight of said peroxide component, and said organic peroxide has an average particle size of less than 15 microns.

11. A process according to claim 4, including adding a cocurative peroxide component to said dry sealant component to form the sealant composition, said peroxide component containing an organic peroxide in an amount from about 0.5 to about 10.0 mole per mole of said quinoid curing agent, and said peroxide component optionally containing from about 0.1 to about 20 parts by weight of a polar solvent accelerator based upon 100 parts by weight of said peroxide component.

12. A process according to claim 6, including adding a cocurative peroxide component to said dry sealant component to form the sealant composition, said peroxide component containing an organic peroxide in an amount from about 0.5 to about 10.0 mole per mole of said quinoid curing agent, said peroxide component optionally containing from about 0.1 to about 20 parts by weight of a polar solvent accelerator based upon 100 parts by weight of said peroxide component, and said organic peroxide has an average particle size of less than 15 microns.

13. A process according to claim 10, wherein the amount of said organic peroxide is from about 1.0 to about 5.0 moles per mole of said quinoid curing agent, wherein the amount of said optional polar solvent accelerator is from about 0.5 to about 15 parts by weight based upon 100 parts by weight of said peroxide component, wherein said organic peroxide has an average particle size of less than 5 microns, and including curing said sealant composition at a temperature of from about 15° C. to about 125° C.

14. A process according to claim 11, including curing said sealant composition at a temperature of from about 15° C. to about 125° C.

15. A process according to claim 12, wherein the amount of said organic peroxide is from about 1.0 to about 5.0 moles per mole of said quinoid curing agent, wherein the amount of said optional polar solvent accelerator is from about 0.5 to about 15 parts by weight based upon 100 parts by weight of said peroxide component, wherein said organic peroxide has an average particle size of less than 5 microns, including curing said sealant composition at a temperature of from about 15° C. to about 125° C.

16. A sealant composition, comprising:
a dry sealant component, said dry sealant containing from about 55 percent to about 90 percent by weight of at least one low molecular weight tackifier, from about 10 percent to about 45 percent by weight of at least one high molecular weight rubber polymer, said low molecular weight liquid tackifier having a number average molecular weight of from about 500 to about 5,000, and from about 0.2 to about 2.0 parts by weight per 100 parts by weight of said dry sealant component of a quinoid curing agent, said quinoid curing agent added as dissolved particles in a solubilizing organic polar solvent to a rubber cement comprising said sealant component dissolved in a hydrocarbon solvent with precipitation therein during mixing and the subsequent removal of the volatile solvent of the rubber cement so that said quinoid curing agent is finely and uniformly dispersed in said dry sealant component, said precipitated quinoid curing agent having an average particle size of 10 microns or less;
a peroxide component, said peroxide component comprising an organic peroxide and optionally a polar accelerator, the amount of said organic peroxide being from about 0.5 to about 10.0 moles per mole of said quinoid curing agent; and
optionally from about 0.1 to about 50 parts by weight of a reinforcing agent per 100 parts by weight of said dry sealant.

17. A composition according to claim 16, wherein the average particle size of said peroxide cocurative is less than 10 microns.

18. A composition according to claim 17, including from about 0.01 to about 2 parts by weight per 100 parts by weight of said dry sealant component of a surfactant and from 0.1 to about 20 parts by weight per 100 parts of said peroxide component of a polar solvent accelerator.

19. A composition according to claim 18, wherein the amount of said quinoid curing agent is from 0.3 to about 1.0 parts by weight and wherein the amount of said organic peroxide is from about 1.0 to about 5.0 moles per mole of said quinoid curing agent.

20. A sealant composition according to claim 19, wherein said high molecular weight polymers are selected from the group consisting of EPDM, polybutadiene, butyl rubber, halo butyl rubber, acrylonitrile-butadiene copolymer, styrene-butadiene copolymer, natural rubber, cis-polyisoprene, and combinations thereof, and wherein said liquid tackifier has a number average molecular weight of from about 500 to about 5,000, and wherein said quinoid curatives and peroxide cocuratives have an average particle size of less than 5 microns.

* * * * *